Dec. 27, 1932.    A. N. BENN    1,891,906
APPARATUS FOR SMOKING MEAT
Filed Oct. 12, 1929    2 Sheets-Sheet 1
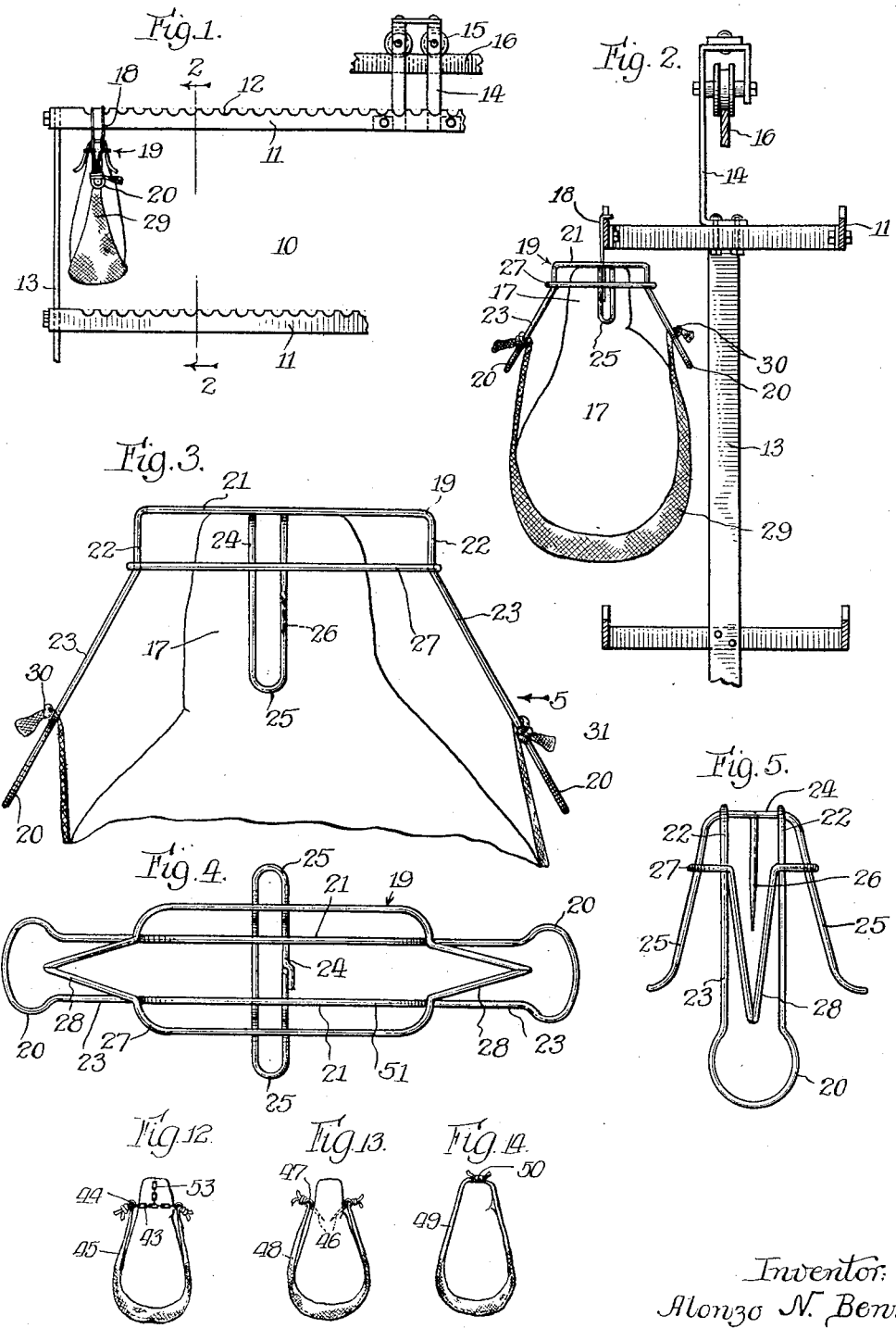
Inventor:
Alonzo N. Benn,
Rector, Hibben, Davis & Macauley Attys Dec. 27, 1932.　　　A. N. BENN　　　1,891,906
APPARATUS FOR SMOKING MEAT
Filed Oct. 12, 1929　　2 Sheets-Sheet 2
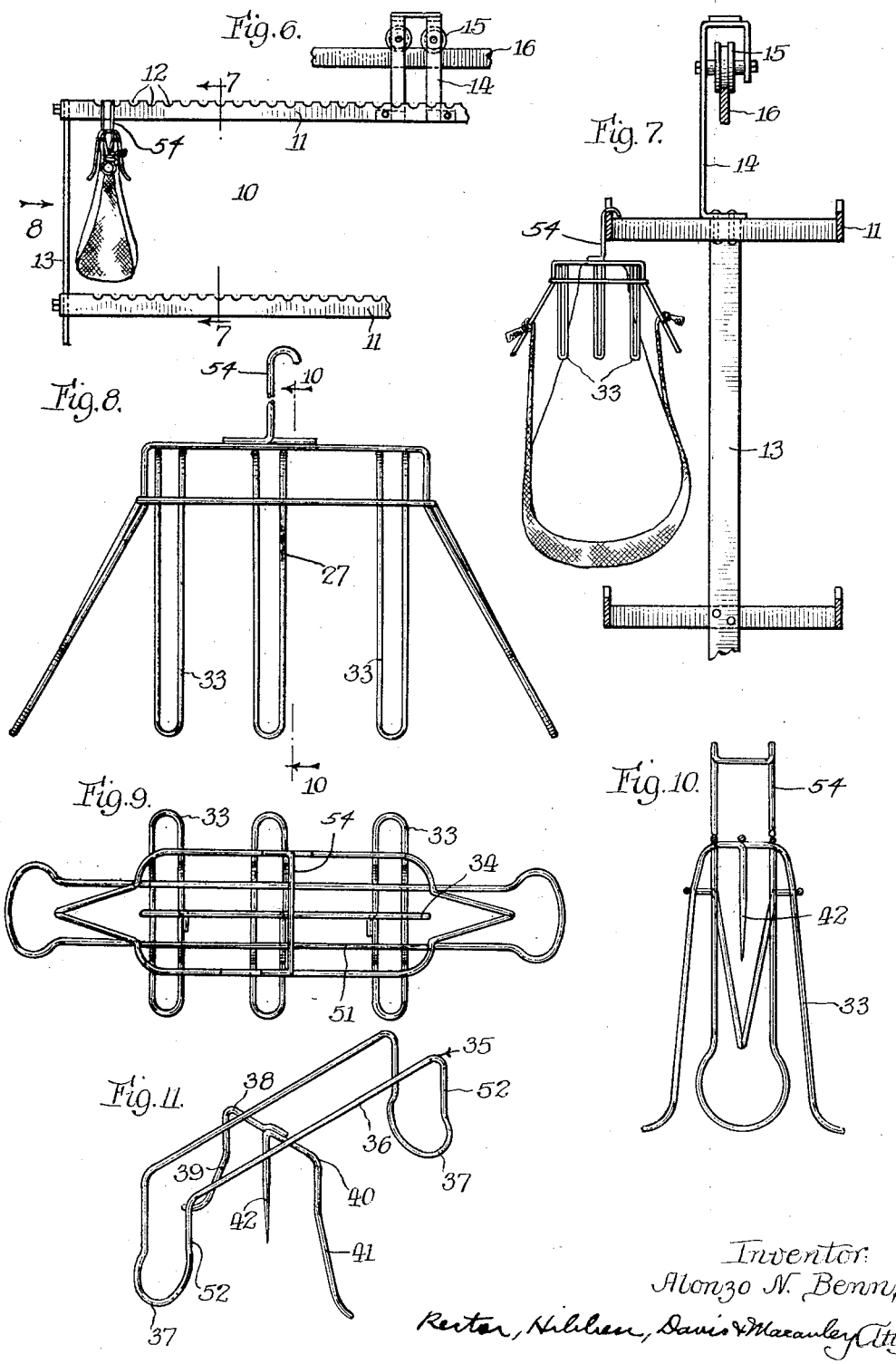

Patented Dec. 27, 1932

1,891,906

UNITED STATES PATENT OFFICE

ALONZO N. BENN, OF CHICAGO, ILLINOIS

APPARATUS FOR SMOKING MEAT

Application filed October 12, 1929. Serial No. 399,136.

My invention relates to an apparatus for smoking meat and is concerned more particularly with those classes of meats which are suspended during the smoking operation.

The principal object of my invention is to devise an apparatus for applying a smoking cloth to the portion of the meat which it is desired to protect during the smoking operation and to accomplish this result with ease, rapidity, an economy in the amount of cloth required, and the attainment of a characteristic individual, shaping pressure which is determined solely by the degree of tautness with which the cloth is initially applied and is independent of any deforming tendency arising from gravity action on the meat.

A further object is to devise an apparatus for effectuating the above method, which comprises an arrangement carried by the meat and to which the ends of the smoking cloth are attached, generally prior to the hanging of the meat on a smokehouse trolley.

According to present methods, the meat is customarily hung from the rail of a smokehouse trolley and after being so positioned, a strip of smoking cloth is bound around the lower, or butt end in the case of a ham, and the end secured, either directly to the rail or to some other part which is carried by the trolley. The cloth generally sustains a portion of the weight of the meat and its purpose is to protect the meat against the direct action of the rising hot gases and also to initially shape the soft portions contacted, with a view of preventing the creation of drawn and distorted conditions during smoking and assuring the securement of full, symmetrical butt or lower ends. However, it is extremely difficult and practically impossible on a large scale of production to apply a smoking cloth to a suspended ham or other meat and maintain a uniform pressure against the butt end while securing the ends of a cloth, this condition being particularly true in the larger sizes of meats. The degree of pressure obtained under these circumstances is not susceptible of accurate control, since the tendency is either to support a portion of the weight of the meat by the cloth with a possible undesirable severity of pressure and consequent distortion, or to lose the original tautness of the cloth while tying the ends.

It is the express object of the present invention to devise a method of applying a smoking cloth in which the characteristics of the meat provide the necessary standard for determining the shaping pressure, so that the butt ends of hams, for example, which have been smoked after being prepared according to my method, presents a uniform and attractive appearance. Briefly, the method consists in drawing a smoking cloth around the end to be shaped as tightly as the conformation of the meat will permit, without undue distortion, and then securing the ends of the cloth either directly to or over the opposite end of the meat, or to a novel skeleton member which is carried by the meat as described more fully hereinafter. The meat is preferably so prepared prior to being suspended on a trolley and it will be obvious that gravity action on the meat while suspended exerts no effect on the shaping pressure, so that a high degree of uniformity in the product is secured. The special member above noted, is particularly arranged to facilitate the rapid application and securement of the cloth and when used in connection with beef hams, insides, outsides, and knuckles is especially designed to afford an adequate support for the pliable shank or small end owing to the absence of all or substantially all of the bone.

These and further objects of my invention will be set forth in the following specification, reference being had to the accompanying drawings, and the novel means by which said objects are effectuated will be definitely pointed out in the claims.

In the drawings:

Figure 1 is a partial elevation of a smokehouse trolley showing a pork ham suspended therefrom and arranged for smoking according to my improved method.

Fig. 2 is an enlarged sectional view along the line 2—2 of Fig. 1, looking in the direction of the arrows.

Fig. 3 is a further enlarged view of the shank end of the ham as it would appear with my improved arrangement when viewed from the opposite side thereof, as shown in Fig. 2.

Fig. 4 is a plan view of the skeleton member utilized to carry the smoking cloth, as viewed in Fig. 3.

Fig. 5 is an end view of the skeleton member, looking in the direction of the arrow 5 in Fig. 3.

Fig. 6 is a view of a smokehouse trolley, similar to that shown in Fig. 1, and illustrating a modification of the method when used in connection with beef hams, or similar classes of meat from which all, or substantially all of the bone has been removed.

Fig. 7 is an enlarged view taken along the line 7—7 of Fig. 6, looking in the direction of the arrows.

Fig. 8 is an enlarged side view of the skeleton member shown in Fig. 6, looking in the direction of the arrow 8 in said figure.

Fig. 9 is a plan view of the skeleton member as viewed in Fig. 8.

Fig. 10 is a sectional view of the skeleton member taken along the line 10—10 in Fig. 8, looking in the direction of the arrows.

Fig. 11 is a perspective view illustrating a further modification of a skeleton member which may be utilized for different classes of meats.

Figs. 12, 13 and 14 illustrate further modifications and suggestions for applying a smoking cloth to a ham or other types of meats according to my improved method.

The numeral 10 represents a portion of a smokehouse trolley which is provided with the usual horizontal bars 11, having the customary, spaced serrations, or notches, 12, and which are connected at their ends by the vertical uprights 13. A hanger 14 is secured to the upper bar 11 and rollers 15 are revolubly mounted in said hanger for engagement with the rails 16, whereby the trolley may be moved from place to place in the smokehouse. For purpose of illustration, my improved method and apparatus for effectuating the same will be described first as applied to a pork ham and second, as applied to a beef ham, but it will be understood that the broadest aspects of the invention contemplate its application to smoked meats in general, including hams of all kinds, picnics, shoulders and other types.

The ham 17 will be suspended from one of the bars 11 by the cord 18 in the usual manner, but before being so positioned, it will have attached thereto the cloth presently noted. A skeleton member 19 is applied to the shank end of the ham 17 and said members is preferably formed of wire as affording the necessary structural strength and characteristic type of functioning desired, without preventing the access of the hot gases and smoke to the surface of the ham.

The skeleton member 19 comprises an elongated loop portion 51 which is formed by bending a length of wire into the desired shape with parallel sides, excepting at the ends thereof which are circularly enlarged as indicated by the numeral 20. The loop portion 51 is then bent into the shape of an inverted U forming an upper horizontal portion 21 of the desired length, from which a pair of vertical portions 22 depend at each end thereof. The ends 20 are then flared outwardly below the vertical portions 22 as shown clearly in Fig. 3, to form attaching arms 23 for the free end of the smoking cloth as hereinafter described. The skeleton member 19 also includes a part 24, formed by looping a single piece of wire and thereafter bending said loop into the shape of an inverted U to form a pair of downwardly and outwardly extending prongs 25, the upper, horizontal portion of the part 24 being secured in any approved manner to the horizontal part 21 of the loop portion 51, as shown clearly in Fig. 5. A portion of the wire which is utilized to form the part 24 is bent directly downwardly between the prongs 25 and is sharpened at the lower end thereof to form a spike 26 for a purpose hereinafter explained. Preferably, the part 24 is secured to the portion 51 in a location to center the spike 26 between the arms 23, thereby obviating unnecessary handling of the member 19 and rendering the same immediately applicable to the shank ends of hams which are right and left hand with reference to the butt. A strengthening frame 27, also formed of wire, is bent around the parallel, vertical portions 22 and the prongs 25 to prevent spreading thereof and also prevent slippage of the skeleton from the shank end of the ham, or the shank or small ends of other pieces of meats. Each end of said frame is formed as a V-shaped arm 28 which lies in the same plane as the arm 23 and is enclosed wholly within the parts of the wire defining said arm, as shown in Fig. 5.

The skeleton 19 is applied to the shank end of the ham 17 by embedding the spike 26 therein, so that the relation of said member and said ham is as shown in Figs. 2 and 3, the ham at this time not being suspended from the smokehouse trolley. The arms 23 and 28 stand substantially clear of the sides of the shank to receive the ends of the smoking cloth as will now be described. One end of the cloth 29 is formed with a simple knot 30 and is then passed between the limbs of one of the V-shaped arms 28 until the knot 30 engages therewith at the apex of said arm. The end of the cloth 29 in question being so immobilized, said cloth is then looped around the butt end of the ham, see Figs. 2 and 3, and is then passed through the other V-shaped arm 28 and drawn sufficiently tight to effect the desired initial shaping of the indicated end of the meat, whereupon the free end of said cloth is then looped around the adjacent arm 23 as many times as is desired just above the circular enlargement 20. The latter prevents movement of the cloth downwardly along the arm, while the relation of the cloth to the arm is such as to take advantage of the forces acting in the former to press the wrapped portion of the cloth against the arm and hold it securely in position, as shown clearly in Fig. 3. The ham so prepared may then be strung and suspended from the trolley as shown in Figs. 1 and 2 for smoking.

The smoking cloth 29 is positioned to fulfill the usual requirements of elements of this character and it will be particularly observed that the mounting of the same on the ham can be effected with considerable ease and rapidity, which in conjunction with the facility with which the cloth may be adjusted and fixed in position to effect any desired initial shaping of the butt end of the meat, constitutes the principal features of my invention. In addition, this manner of applying the cloth to the ham results in a considerable saving in the amount of cloth required over the method now practiced in the industry, wherein it is necessary either to extend the cloth wholly up to one of the horizontal bars of the trolley for knotting thereto or in addition to extend the cloth along a portion of said bar until it reaches the next ham in position. The skeleton member 19 is characterized by simplicity of structure and is easily cleaned while the embodiment therein of the two circularly enlarged portions 20 and the position relation of the spike 26 improves the versatility of the member in use.

In the modified arrangement shown in Figs. 6 to 10, inclusive, which is intended for use in connection with the smoking of meats from which the bone has been wholly or partially removed and which accordingly requires more adequate support during the smoking operation, the only difference from the cage member above described resides in the use of additional prong members 33, which are similar to the prongs 25, shown in Fig. 5, excepting for the spike member which forms a part only of the central prong member and is centrally located between the arms 23, as in Fig. 3. Preferably, three sets of prong members 33 may be employed and they have sufficient length to extend downwardly along the shank or small end, as shown in Fig. 7, to afford an adequate support for this extremely pliable portion of the meat. In addition, it is contemplated that a grid wire 34 may be carried by the horizontal portions of the prong members 33 between the horizontal portions of the loop member 51 to prevent protruding of the meat between the elements of the skeleton member in this location and also a hook shaped member 54 for supporting the skeleton member on the trolley.

The modification shown in Fig. 11 is a simplified arrangement showing a skeleton member 35 which may be employed under certain circumstances. Said member is likewise formed from wire which is bent into an elongated loop whose ends are circularly enlarged as at 37 for receiving the ends of the smoking cloth. The loop portion 36 is bent into the shape of an inverted U and midway of the depending limbs 52 thereof, which include the portions 37, the wire 38 is secured to one of the horizontal portions of the loop 36 and is provided with a downwardly and outwardly extending prong member 39. Similarly, a wire 40 is secured to the other horizontal portion of the loop member 36 and is provided with a downwardly and outwardly extending prong member 41 and also with a downwardly extending spike member 42 which is positioned between the horizontal portion of the loop member 36. The wires 38 and 40 are secured to each other and also to the member 36. The manner of applying this modification to a ham is generally similar to that heretofore described, with the exception that the ends of the smoking cloth must be actually tied or wrapped several times around the portion 37 of the member 35.

Fig. 12 illustrates a further modification of the method for applying a smoking cloth which consists in slipping a chain loop 43 over the shank end of the ham, said loop being provided with a pair of rings 44 to which are secured the ends of the smoking cloth 45 in any desired manner and also a chain connection 53 which is bridged across the loop and intended for engagement with the shank end for holding the loop in position. It is contemplated that the chain loop 43 may carry, as a substitute for the simple rings 44, an arrangement of V-shaped arms 28 and circular portions 20 such as is illustrated in Fig. 3.

In Fig. 13, the modification consists simply in a pair of pin members 46 which are thrust in the shank portion of the ham and which include at their outer ends, rings 47 for attachment of the ends of the smoking cloth 48 thereto. In Fig. 14, the smoking cloth 49 is simply looped around the butt end of the ham and knotted as at 50 across the shank end thereof.

Whichever of the above-noted methods of applying a smoking cloth to a ham, or meats in general, is adopted, it will be apparent that the desired degree of initial shaping of the contacted portion of the meat may be effectually obtained with a maximum of ease on the part of the operator, a minimum of material required, and a certainty as to uniformity in results.

While I have shown one set of elements and combinations thereof for effectuating my improved method and the apparatus for carrying out the same, it will be understood that the same is intended for the purpose of illustration only and in no wise to restrict my disclosure to the exact forms, structures, and steps set forth, for many changes may be made therein without departing from the spirit of my invention.

I claim:

1. An apparatus for smoking meat comprising a skeleton member carried by one end of the meat and having a pair of V-shaped arms arranged in opposed relation, and a smoking cloth looped around the opposite end of the meat for preshaping the same and having its ends arranged for engagement with said arms.

2. An apparatus for smoking meat comprising a skeleton member carried by one end of the meat and having a pair of V-shaped arms arranged in opposed relation, and a smoking cloth having a knotted end secured in one of said arms and looped around the opposite end of said meat for securement to the other of said arms.

3. An apparatus for smoking meat comprising a skeleton member carried by one end of the meat and having a pair of V-shaped arms arranged in opposed relation, a U-shaped arm located adjacent one of said V-shaped arms, and a smoking cloth having a knotted end secured in one of said V-shaped arms and looped around the opposite end of said meat for passage through the other of said V-shaped arms and wrapping engagement with said U-shaped arm.

4. An apparatus for smoking meat comprising a skeleton member carried by one end of the meat and having a pair of V-shaped arms arranged in opposed relation, a U-shaped arm located adjacent one of said V-shaped arms, and a smoking cloth having a knotted end secured in one of said V-shaped arms and looped around the opposite end of said meat for passage through the other of said V-shaped arms and wrapping engagement with said U-shaped arm, said U-shaped arm and the adjacent, downwardly extending portion of the cloth being relatively disposed to prevent a loosening of the wrapped portion of said cloth.

5. An apparatus in the form of a skeleton member for smoking meat comprising an elongated wire loop bent into an intermediate portion for engaging one end of the meat and a pair of oppositely disposed arms extending downwardly along the sides of the meat, and a second elongated loop having an intermediate portion disposed below the plane of said first intermediate portion and a pair of oppositely disposed, V-shaped arms, and a smoking cloth bound around the opposite end of the meat for preshaping the same, said cloth being attached at one end to a V-shaped arm and at the other end to both of the adjacent arms.

6. An apparatus in the form of a skeleton member for smoking meat comprising an elongated wire loop bent into an intermediate portion for engaging one end of the meat and a pair of oppositely disposed arms extending downwardly along the sides of the meat, a wire disposed transversely of said intermediate portion and bent downwardly therefrom to form an attaching spike for embedding in the meat, a second elongated loop having an intermediate portion disposed below the plane of said first intermediate portion and a pair of oppositely disposed, V-shaped arms, and a smoking cloth bound around the opposite end of the meat for preshaping the same, said cloth being attached at one end to a V-shaped arm and at the other end to both of the adjacent arms.

7. An apparatus in the form of a skeleton member for smoking meat comprising an elongated wire loop bent into an intermediate portion for engaging one end of the meat and a pair of oppositely disposed arms extending downwardly along the sides of the meat, a wire arranged transversely of said intermediate portion comprising two arms bent downwardly therefrom along the sides of the meat and an attaching spike disposed between said arms for embedding in the meat, a second elongated loop having an intermediate portion disposed below the plane of said first intermediate portion and a pair of oppositely disposed, V-shaped arms, and a smoking cloth bound around the opposite end of the meat for preshaping the same, said cloth being attached at one end to a V-shaped arm and at the other end to both of the adjacent arms.

8. An apparatus in the form of a skeleton member for smoking meat comprising an elongated wire loop bent into an intermediate portion for engaging one end of the meat and a pair of oppositely disposed arms extending downwardly along the sides of the meat, and a second elongated loop having an intermediate portion disposed below the plane of said first intermediate portion and a pair of oppositely disposed, V-shaped arms, said first and V-shaped arms at each end of the member lying substantially in the same plane, and a smoking cloth bound around the opposite end of the meat for preshaping the same, said cloth being attached at one end to a V-shaped arm and at the other end to both of the adjacent arms.

9. An apparatus in the form of a skeleton member for smoking meat comprising an elongated wire loop bent into an intermediate portion for engaging one end of the meat and a pair of oppositely disposed arms extending downwardly along the sides of the meat, a wire arranged transversely of said portion and having a positioning spike for embedding in the meat, and a smoking cloth bound around the opposite end of the meat for preshaping the same, said cloth being attached at its ends to said arms.

10. An apparatus for smoking meat comprising a skeleton member carried by one end of the meat and having a plurality of prongs for engaging the sides thereof, and a smoking cloth looped around the opposite end of the meat for preshaping the same and having its ends secured to said member.

11. An apparatus for smoking meat comprising a rigid skeleton member seated on one end of the meat and having a pair of cloth attaching arms arranged in opposed relation and extending downwardly along the sides of the meat, and a smoking cloth looped around the opposite end of the meat for preshaping the same and having its ends secured to said arms.

In testimony whereof, I have subscribed my name.

ALONZO N. BENN.